United States Patent
Tucker

(10) Patent No.: US 6,863,473 B1
(45) Date of Patent: Mar. 8, 2005

(54) BARRIER ISLAND FORMING METHOD FOR BEACH RENOURISHMENT

(76) Inventor: Luther C. Tucker, 4281 Maylor La., Tallahassee, FL (US) 32308

( * ) Notice: Subject to any disclaimer, the term of this patent is extended or adjusted under 35 U.S.C. 154(b) by 0 days.

(21) Appl. No.: 10/775,413

(22) Filed: Feb. 10, 2004

(51) Int. Cl.$^7$ ................................. E02B 3/04
(52) U.S. Cl. .............................. 405/25; 405/15; 405/32; 405/34; 405/35
(58) Field of Search .............................. 405/21, 22, 24, 405/25, 32, 34, 35, 15, 195.1

(56) References Cited

U.S. PATENT DOCUMENTS

| | | | |
|---|---|---|---|
| 2,341,515 A | | 2/1944 | Rehfeld |
| 2,662,378 A | | 12/1953 | Schmitt et al. |
| 2,961,255 A | | 11/1960 | Trott |
| 3,426,536 A | | 2/1969 | Danz |
| 3,564,853 A | | 2/1971 | Csiszar |
| 3,803,852 A | * | 4/1974 | Fernandez-Luque et al. . 405/24 |
| 3,830,066 A | * | 8/1974 | Larsen ......................... 405/25 |
| 3,844,123 A | * | 10/1974 | Larsen ......................... 405/25 |
| 4,089,179 A | | 5/1978 | Trautman |
| 4,118,937 A | | 10/1978 | Mansen |
| 4,397,587 A | * | 8/1983 | Op den Velde et al. . 405/195.1 |
| 4,661,014 A | * | 4/1987 | Aubert ......................... 405/21 |
| 4,688,024 A | | 8/1987 | Gadde |
| 4,710,056 A | | 12/1987 | Parker |
| 4,710,057 A | | 12/1987 | Laier |
| 4,738,563 A | | 4/1988 | Clark |
| 4,770,561 A | | 9/1988 | Holmberg |
| 4,861,193 A | | 8/1989 | Newkirk |
| 4,954,013 A | * | 9/1990 | Lamberton ................... 405/25 |
| 5,015,121 A | | 5/1991 | Perret-Gentil |
| 5,104,258 A | | 4/1992 | Ianell |
| 5,108,222 A | | 4/1992 | Jansson et al. |
| 5,190,403 A | | 3/1993 | Atkinson |
| 5,255,997 A | | 10/1993 | Bailey et al. |
| 5,269,254 A | * | 12/1993 | Gagliano et al. ............. 405/32 |
| 5,348,419 A | | 9/1994 | Bailey et al. |
| 5,636,939 A | | 6/1997 | Brown |
| 5,720,573 A | | 2/1998 | Benedict et al. |
| 5,807,024 A | | 9/1998 | Benedict |
| 5,924,820 A | | 7/1999 | Creter |
| 5,934,827 A | | 8/1999 | Kirby |
| 5,941,661 A | * | 8/1999 | Ishikura ....................... 405/25 |
| 5,944,443 A | | 8/1999 | Benedict |
| 6,164,867 A | | 12/2000 | Sherwin |
| 6,491,474 B1 | | 12/2002 | Maxwell |
| 6,497,532 B1 | * | 12/2002 | McGinn ....................... 405/21 |

* cited by examiner

Primary Examiner—Fredrick L. Lagman

(57) ABSTRACT

A new method for more rapidly renourishing a beach. A mobile accretion unit is set on the bottom a considerable distance out from the beach, yet still within the region where sand is deposited by wave action. This accretion unit collects sand over time. It is gradually raised to keep it from burying itself. The unit eventually creates a small sand "island," which is typically located one hundred feet or more from the beach. A chain of such small sand islands are preferably created along the shore. Radiating sets of linear fences are then placed on each island. These fences radiate out into the surrounding water. The linear fences trap additional sand and serve to increase the size of the islands. Linear fences extending from the islands to the beach may be used, as well as linear fences extending between adjacent islands. Eventually the islands grow together and merge with the prior beach, thereby creating a new beach along the position of the islands.

15 Claims, 15 Drawing Sheets

BARRIER ISLAND FORMING METHOD FOR BEACH RENOURISHMENT

BACKGROUND OF THE INVENTION

1. Field of the Invention

This invention relates to the field of beach and shoreline renourishment. More specifically, the invention comprises a method for accumulating sand on a beach by forming artificial barrier islands.

2. Description of the Related Art

Beach and shoreline erosion is a recognized problem in many areas. Erosion and accretion are natural processes whereby shorelines advance and retreat over time. Where structures are erected on the shoreline, however, the natural erosion jeopardizes property having substantial economic worth.

Various methods have been used to impede or prevent beach erosion. It has long been known that suspending a mesh or net in the water near the beach tends to cause an accumulation of sand in the region of the net. One such device is disclosed in U.S. Pat. No. 3,564,853 to Csiszar (1969). Another approach based on the same concept is disclosed in U.S. Pat. No. 4,089,179 to Trautman (1978). Both these inventions require the deployment of supporting pilings or anchors a considerable distance offshore.

In recent years, efforts have focused on the use of fence structures arrayed in a direction perpendicular to the beach One such fence structure is disclosed in U.S. Pat. No. 4,710,056 to Parker (1987). The Parker device uses a line of flexible mesh suspended from evenly spaced supports. The supports are actually three-legged structures, with each leg being driven or buried in the sand at an angle for added stability.

All these prior art devices extend from the existing beach into the surf. They operate by depositing sand in the immediate vicinity of the beach. The structures are ideally then moved to seaward. Those skilled in the art will know that barrier devices are effective in trapping and depositing sand throughout the region of wave action, including regions far from the beach. The present invention seeks to take advantage of this fact.

BRIEF SUMMARY OF THE INVENTION

The present invention comprises a new method for more rapidly renourishing a beach. A mobile accretion unit is set on the bottom a considerable distance out from the beach, yet still within the region where sand is deposited by wave action. This accretion unit collects sand over time. It is gradually raised to keep it from burying itself. The unit eventually creates a small sand "island," which is typically located one hundred feet or more from the beach.

A chain of such small sand islands are preferably created along the shore. Radiating sets of linear fences are then placed on each island. These fences radiate out into the surrounding water. The linear fences trap additional sand and serve to increase the size of the islands. Linear fences extending from the islands to the beach may be used, as well as linear fences extending between adjacent islands. Eventually the islands grow together and merge with the prior beach, thereby creating a new beach along the position of the islands.

REFERENCE NUMERALS IN THE DRAWINGS

| | | | |
|---|---|---|---|
| 10 | accretion unit | 12 | mesh panel |
| 14 | frame | 16 | lifting beam |
| 18 | lifting cable | 20 | hoist cable |
| 22 | rigging | 24 | sea floor |
| 26 | accreted sand | 28 | ballast |
| 30 | beach | 32 | barge |
| 34 | crane | 36 | accreted island |
| 38 | surf region | 40 | post |
| 42 | mesh panel | 44 | fence assembly |
| 46 | barrier island | 48 | alternate accretion unit |
| 50 | alternate accretion unit | 52 | alternate accretion unit |
| 54 | internal mesh panel | | |

DETAILED DESCRIPTION OF THE INVENTION

Figure 1:
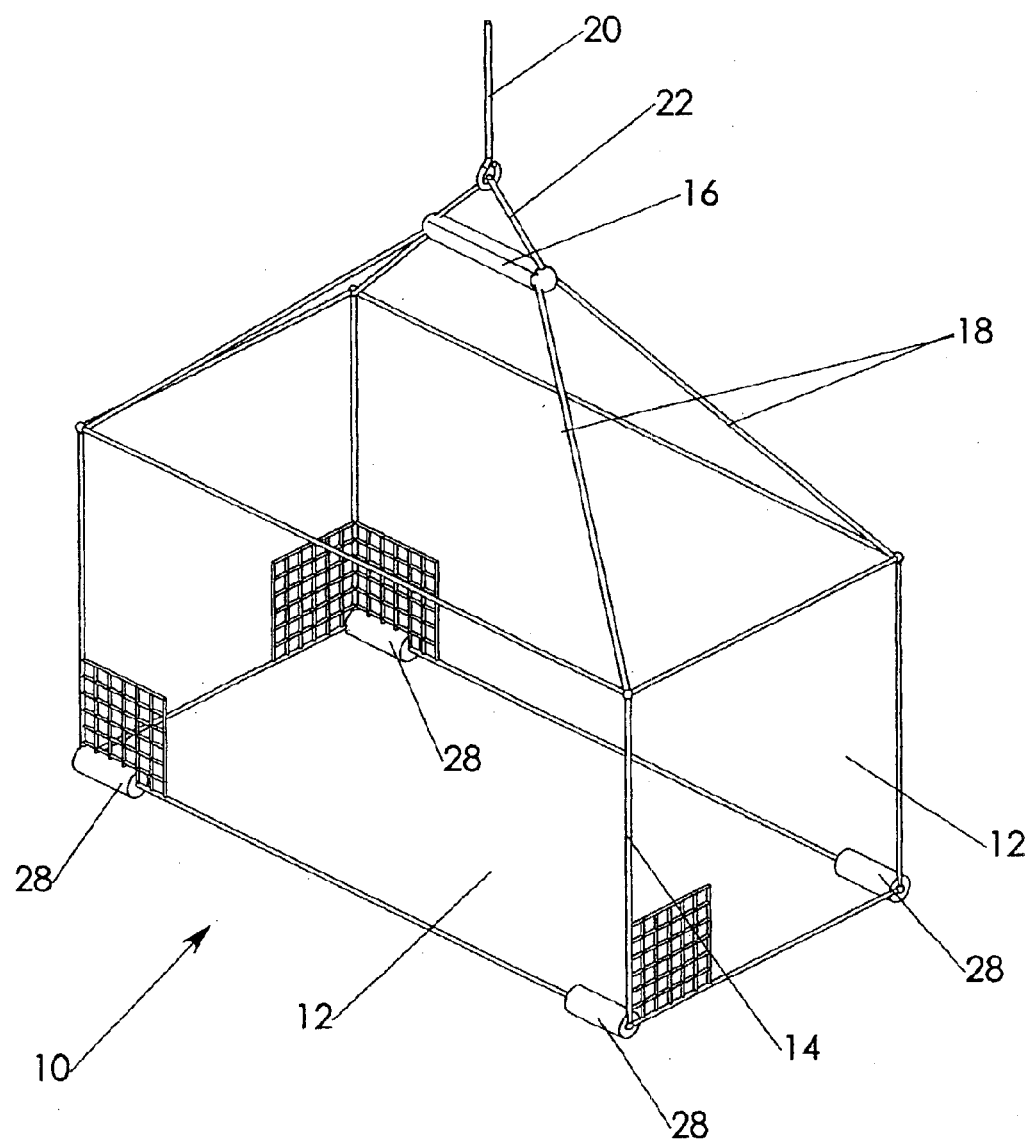
FIG. 1 is a perspective view, showing an accretion unit.

FIG. 1 shows accretion unit 10. This is essentially a rectangular box of four mesh panels 12 mounted in a frame 14. Each mesh panel 12 contains a mesh of wires fixed in place to form a sand-Such trapping grid. Such mesh used for sand-trapping purposes is well known in the art and is described in detail in U.S. Pat. No. 6,491,474(2002). The disclosure of U.S. Pat. No. 6,491,474(2002) is hereby incorporated by reference.

Plastic-coated wire mesh is one effective choice for mesh panel 12. Taut netting can be used as well. In some applications it is desirable to leave the mesh in place (Only pulling out the supporting materials out). For these applications, biodegradable mesh materials are preferable. Examples include natural fiber netting such as hemp netting.

For purposes of visual clarity in all the drawing views, only a portion of the mesh is illustrated for each mesh panel 12. In reality, the mesh covers the entire panel, or a substantial portion thereof.

Several ballasts 28, which may be formed of sand-filled or cement filled drums, are preferably added to make accretion unit 10 more stable. Lifting cables 18 are attached to each corner of the frame and joined together via lifting beam 16. Rigging 22 is provided so that a hoist cable 20 can be attached to lifting beam 16. With these features, hoist cable 20 can be used to raise and lower accretion unit 10.

Accretion unit 10 is designed to be placed on the sea floor a considerable distance from the beach. It should be placed within the zone where sand is suspended in the water via wave action. However, it will generally be completely submerged when initially placed. Thus, a typical placement would be between about 50 feet and about 250 feet from the beach at low tide.

Figure 2:
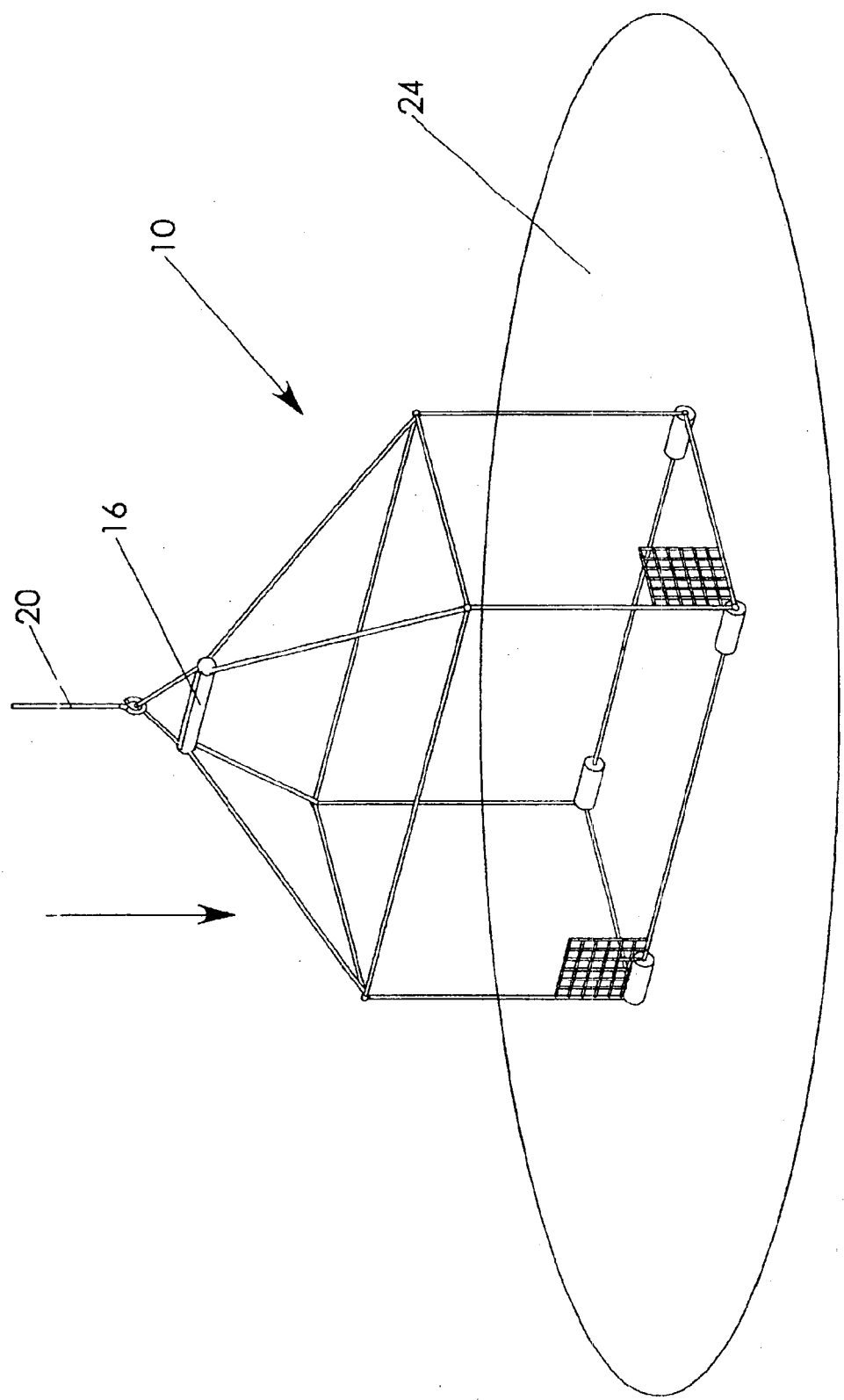
FIG. 2 is a perspective view, showing the placement of the accretion unit on the sea floor.

FIG. 2 shows accretion unit 10 being lowered to sea floor 24. Once in the position shown, hoist cable 12 is removed and the accretion unit is allowed to rest on the bottom. The weight of the unit generally provides enough stability to keep it in position. However, if heavy surf or currents are encountered, it may be necessary to periodically reposition the accretion unit.

Figure 3:
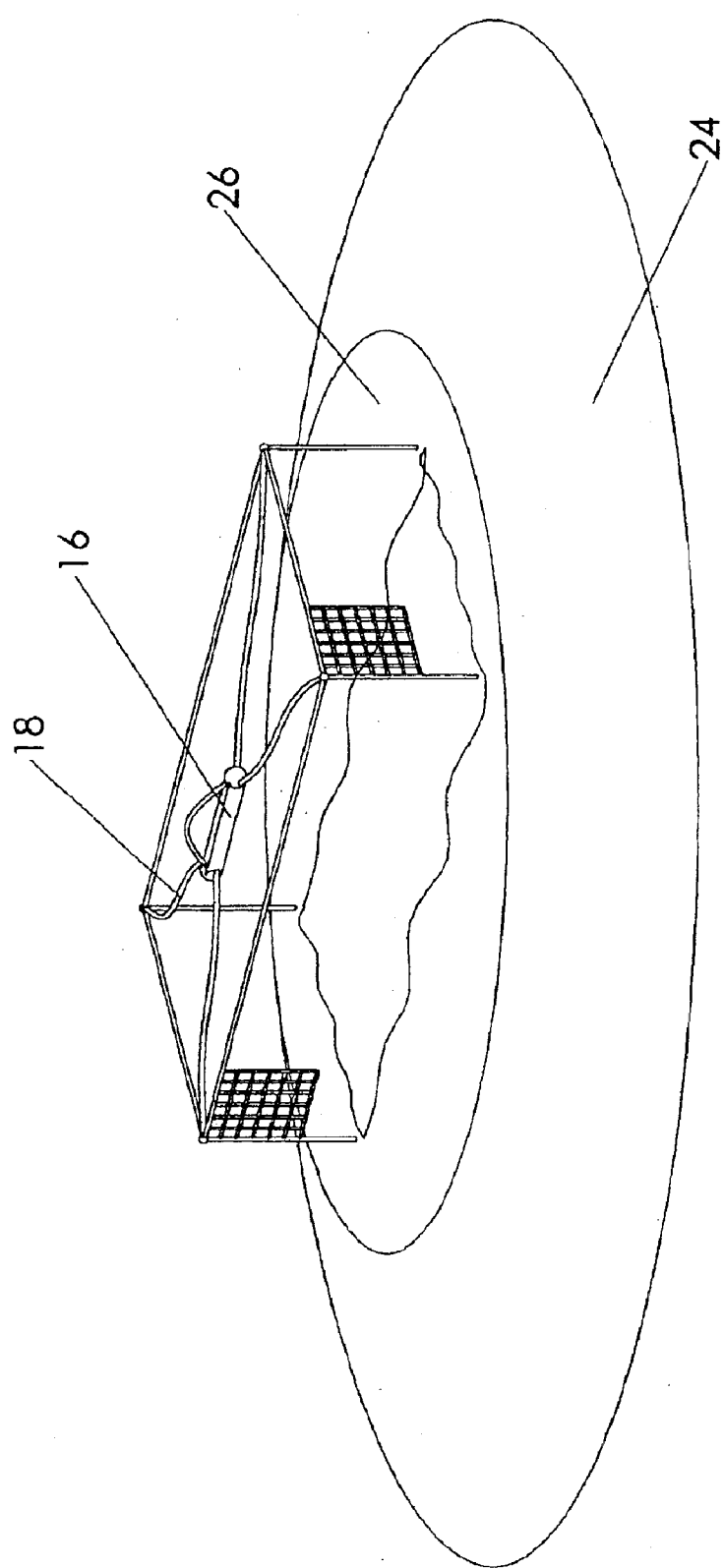
FIG. 3 is a perspective view, showing the accretion of sand around the accretion unit.
Figure 4:
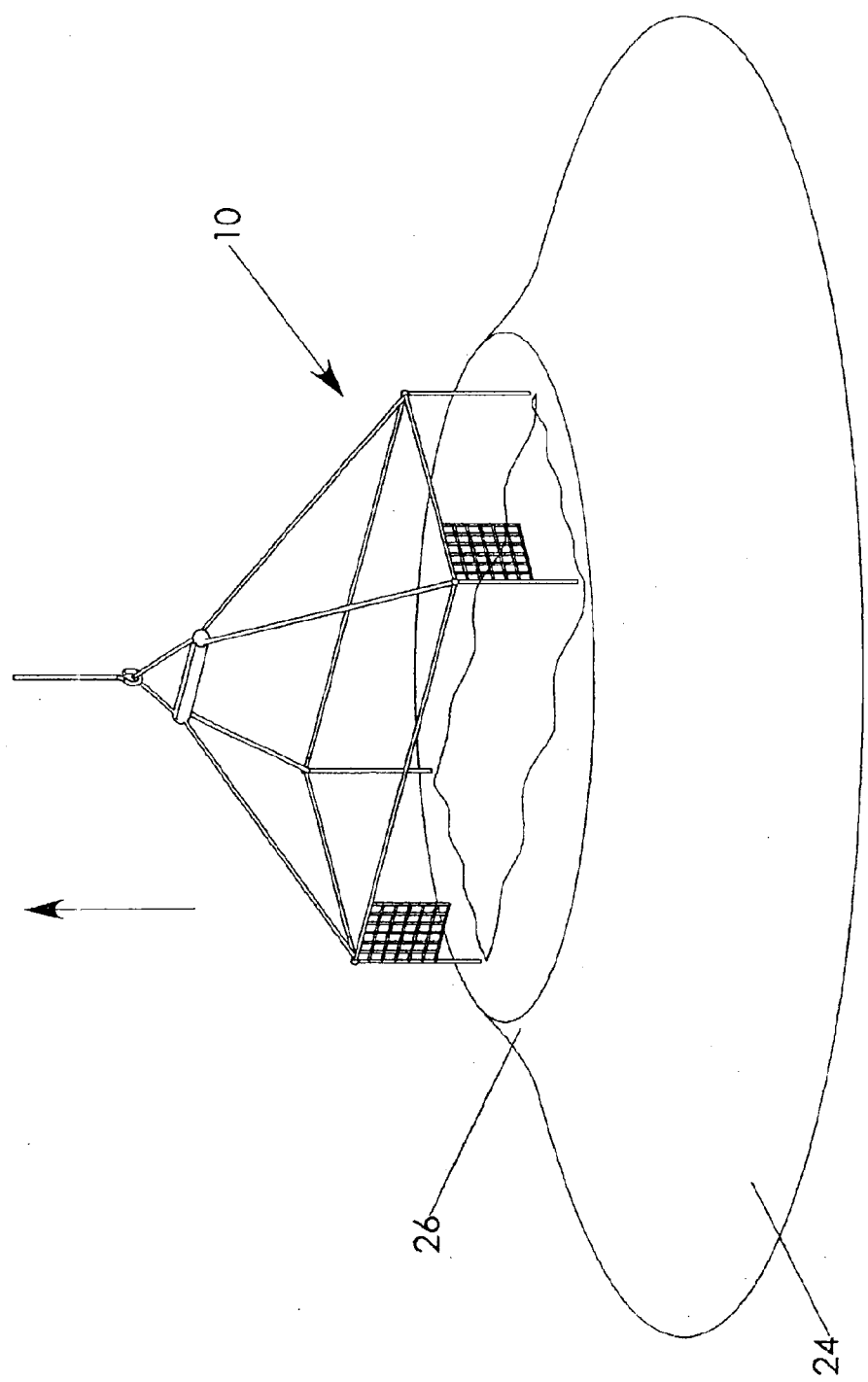
FIG. 4 is a perspective view, showing the raising of the accretion unit.

Those skilled in the art will know that the mesh panels will tend to entrap and accumulate sand suspended in the water. This sand will tend to accumulate around the mesh panels, as shown in FIG. 3. Accreted sand 26 will build up gradually. It is therefore necessary to lift accretion unit 10 in order to prevent its entrapment. In FIG. 4, the hoisting cable is used to lift the accretion unit a short distance upward. Sand will tend to flow under the evacuated volume, so that when the hoisting cable is removed the accretion unit will settle back to the sea floor, but at a higher elevation.

Figure 5:
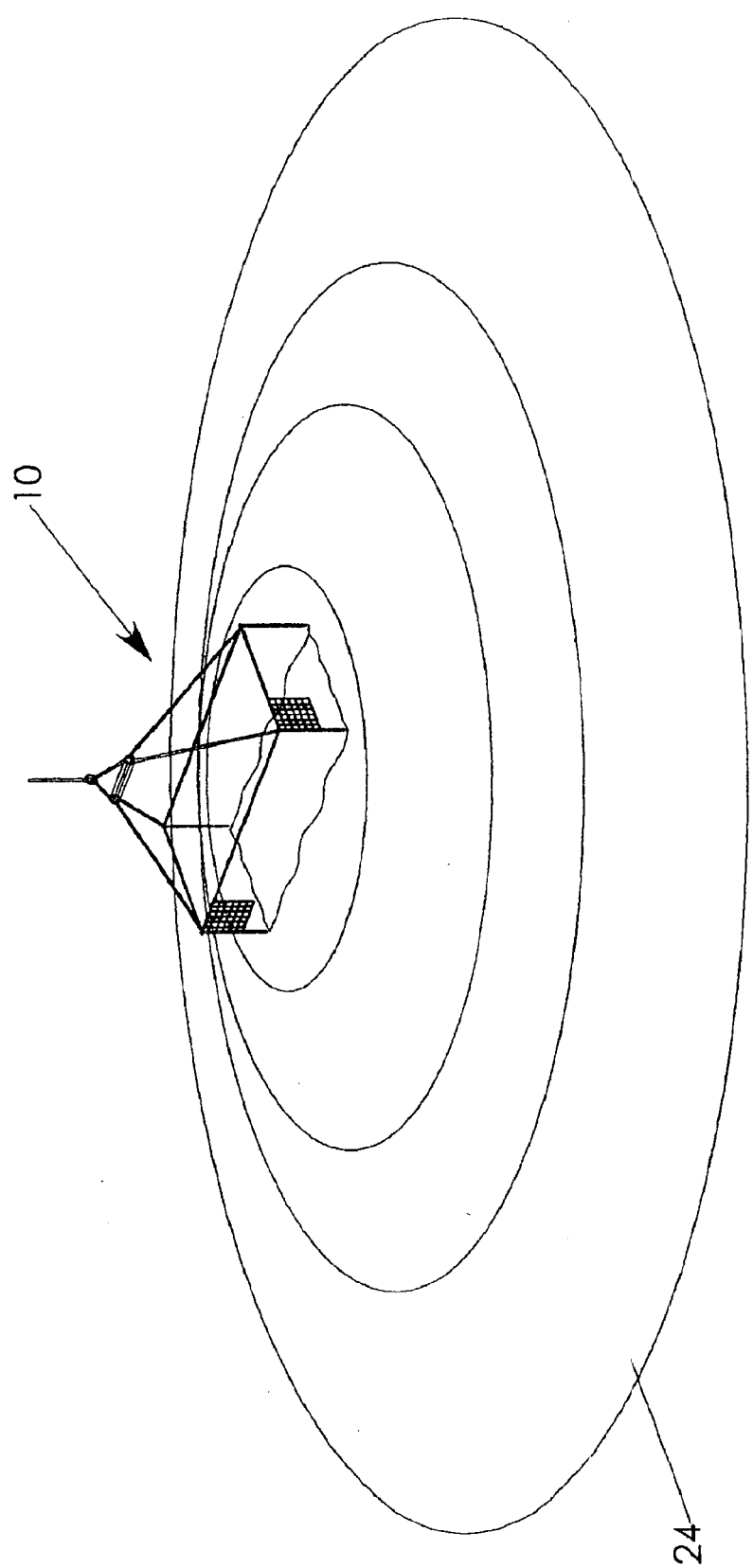
FIG. 5 is a perspective view, showing the operation of the accretion unit.

As this process continues, a submerged mound of sand is created. The mound itself tends to accumulate more sand, creating an artificial sand bar stabilized by the accretion unit. FIG. 5 shows the expanded region of accreted sand deposited around the accretion unit.

Accretion unit 10 can be made in many different sizes. However, reasonably large sizes are practical for beach renourishment over a large area. As an example, the accretion unit might measure 40 feet long by 20 feet wide by 10 feet high. It is impractical to place and raise units of this size using hand labor. Barges must often be used.

Figure 6:
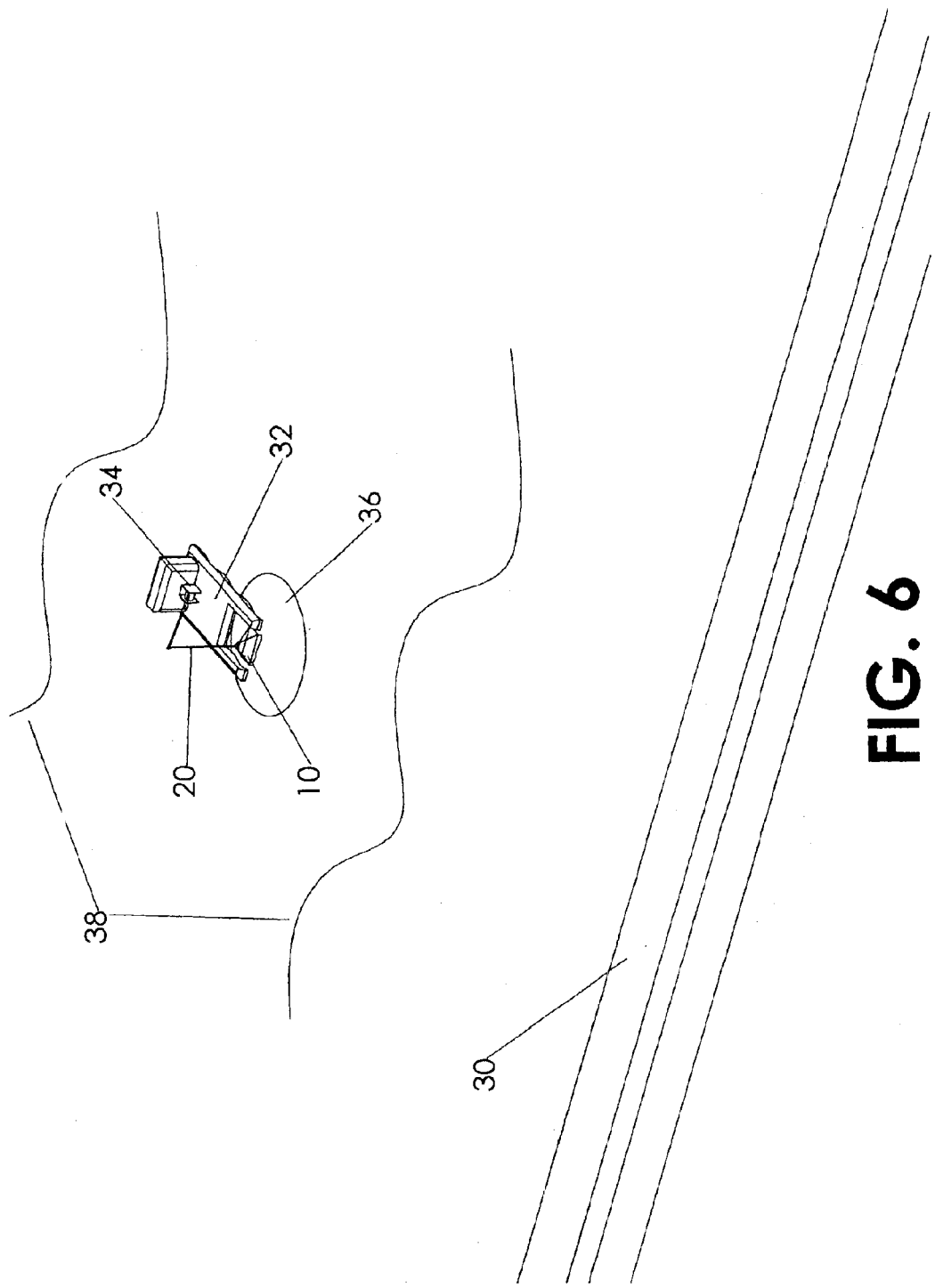
FIG. 6 is a perspective view, showing the use of a barge to place an accretion unit.

FIG. 6 shows a barge 32 mounting a crane 34. Crane 34 is used to raise and lower hoist cable 20, thereby raising and lowering accretion unit 10. In this view, the reader will appreciate how accreted island 36 can be formed a considerable distance from the beach. It can be formed well beyond the range of the breaking surf.

It can also be formed between two surf regions 38. Many beaches have an inner surf region breaking on the beach itself and an outer surf region of waves breaking over a sand bar. FIG. 6 actually shows such a situation. In order to avoid overly disruptive wave action, it is often advisable to form the accreted island between the two surf regions. However, the reader should be aware that the accretion unit can be placed on the sand bar or seaward of the sand bar as well.

The previous descriptions have discussed the formation of a single accreted island. Those skilled in the art will know that the production of a single sand island is of limited value in renourishing an eroded beach. A more effective approach is to create a chain of such islands running parallel to the beach, thereby forming a set of "barrier islands." In order to accomplish this goal, a plurality of accretion units are set along the beach a short distance apart.

Figure 7:
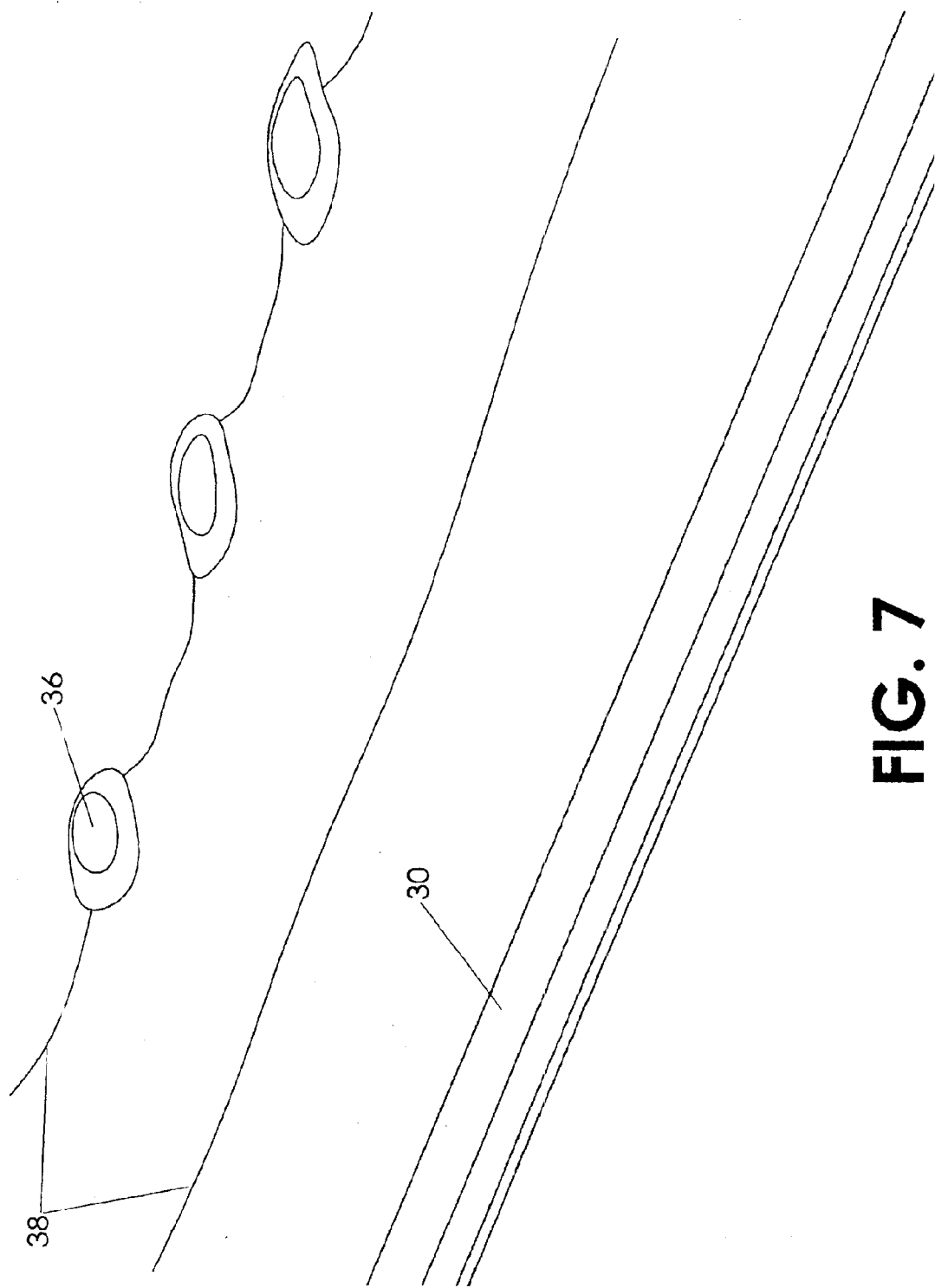
FIG. 7 is a perspective view, showing the creation of accreted islands.

Multiple accretion units can be adjusted periodically by a single barge moving up and down the chain. The result is a string of accreted islands 36 as shown in FIG. 7. These islands lie out in the water a considerable distance from beach 30. They may be formed at various distance with respect to surf regions 38. The only limit is the fact that the accretion units must be placed within the region of the water containing a concentration of suspended sand particles. In most applications, this limitation means that the accreted islands will not be formed more than 300 feet from the existing beach.

Figure 8:
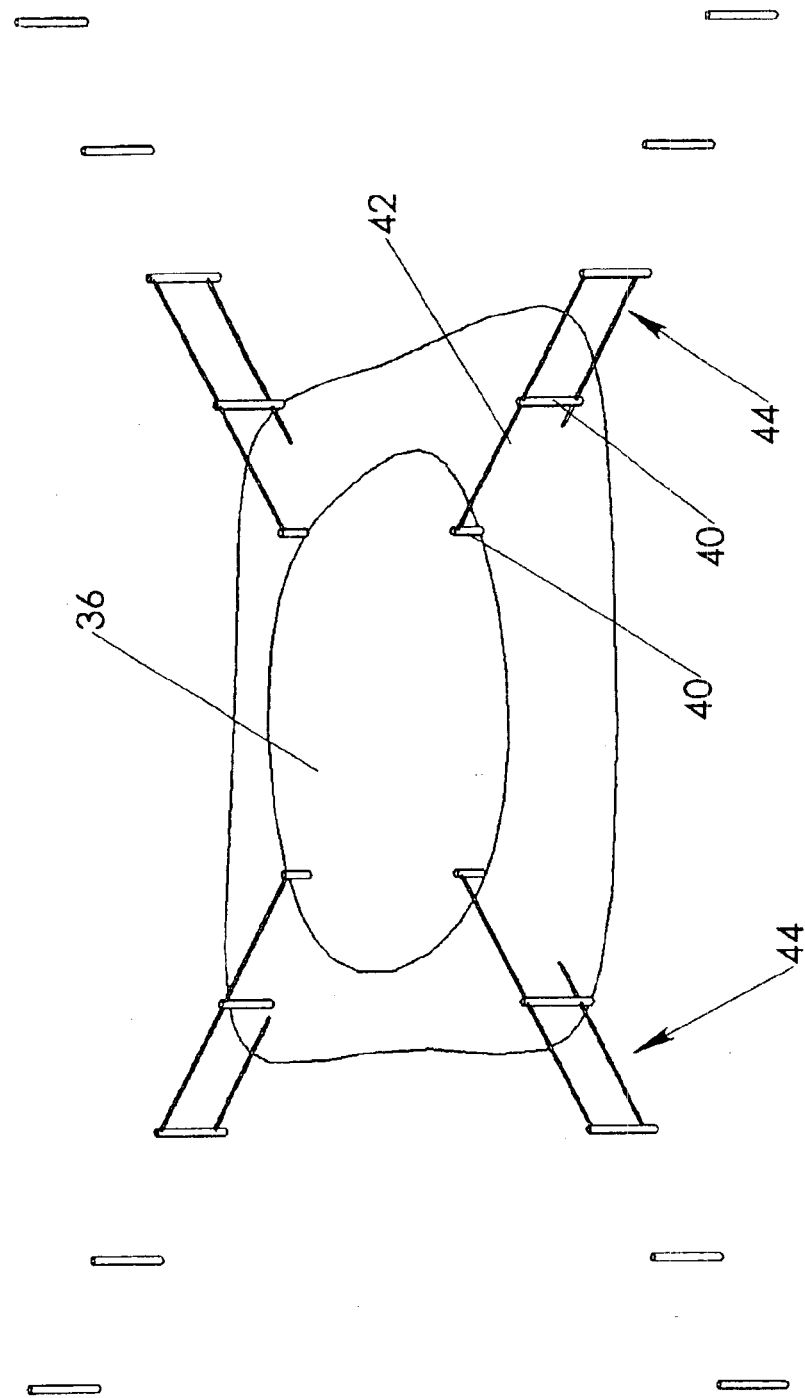
FIG. 8 is a perspective view, showing the placement of linear fences radiating outward from an accreted island.

Once an accreted island is in position, the next step in the inventive process is to expand its size using additional sand-trapping mesh panels. FIG. 8 shows a detail view of one accreted island 36. A series of posts 40 are placed to support linear arrays (the term "linear" is intended to mean only a line of panels, not necessarily a straight line) of mesh panels 42 to form fence assemblies 44 (Again, the reader should realize that each mesh panel includes a mesh of wires fixed in place to form a sand-trapping grid). Only the outline of each panel is shown in the views, as the grid itself is too dense to properly display.

The fence assemblies are placed out into the water surrounding the accreted island. Wave action then deposits sand around the mesh panels in a manner well known to those skilled in the art. The results is the expansion of the accreted island as shown. The reader should bear in mind that the fence assemblies can be placed before the accreted island actually rises above the water's surface (even though the islands are shown as having emerged in the views). The fence assemblies can work well in depths of three feet or more.

Figure 9:
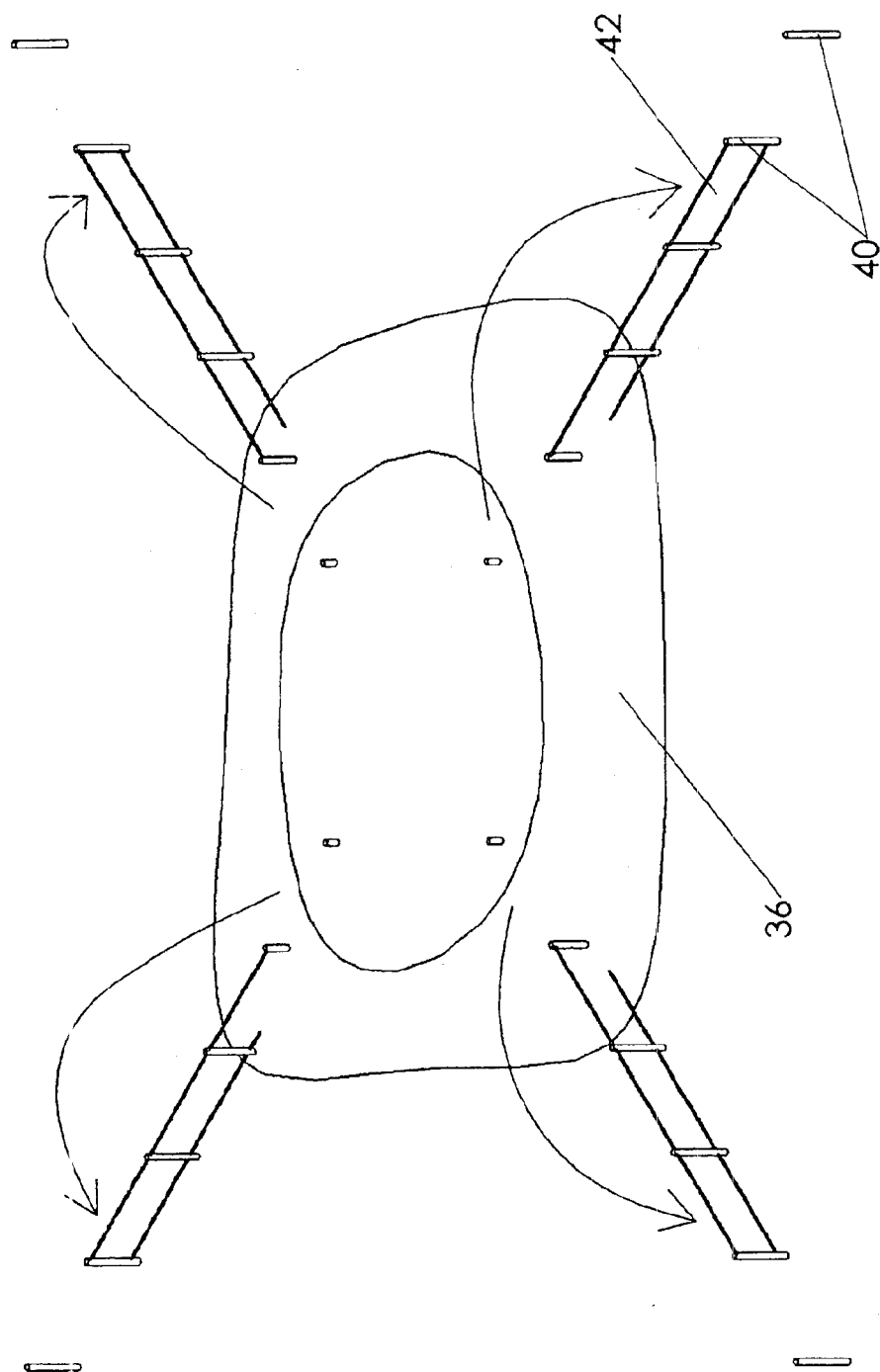
FIG. 9 is a perspective view, showing the extension of the linear fences.

Conventional linear sand fences can be used. Alternatively, the walking sand snare disclosed in U.S. Pat. No. 6,491,474 (2002) can be employed to "walk" a series of mesh panels outward from the island as the size of the island increases. FIG. 9 actually shows the use of a walking sand snare, with a mesh panel being removed from the landward side to the seaward side as sand accumulates. A walking sand snare is extended in four directions in the view.

Figure 10:
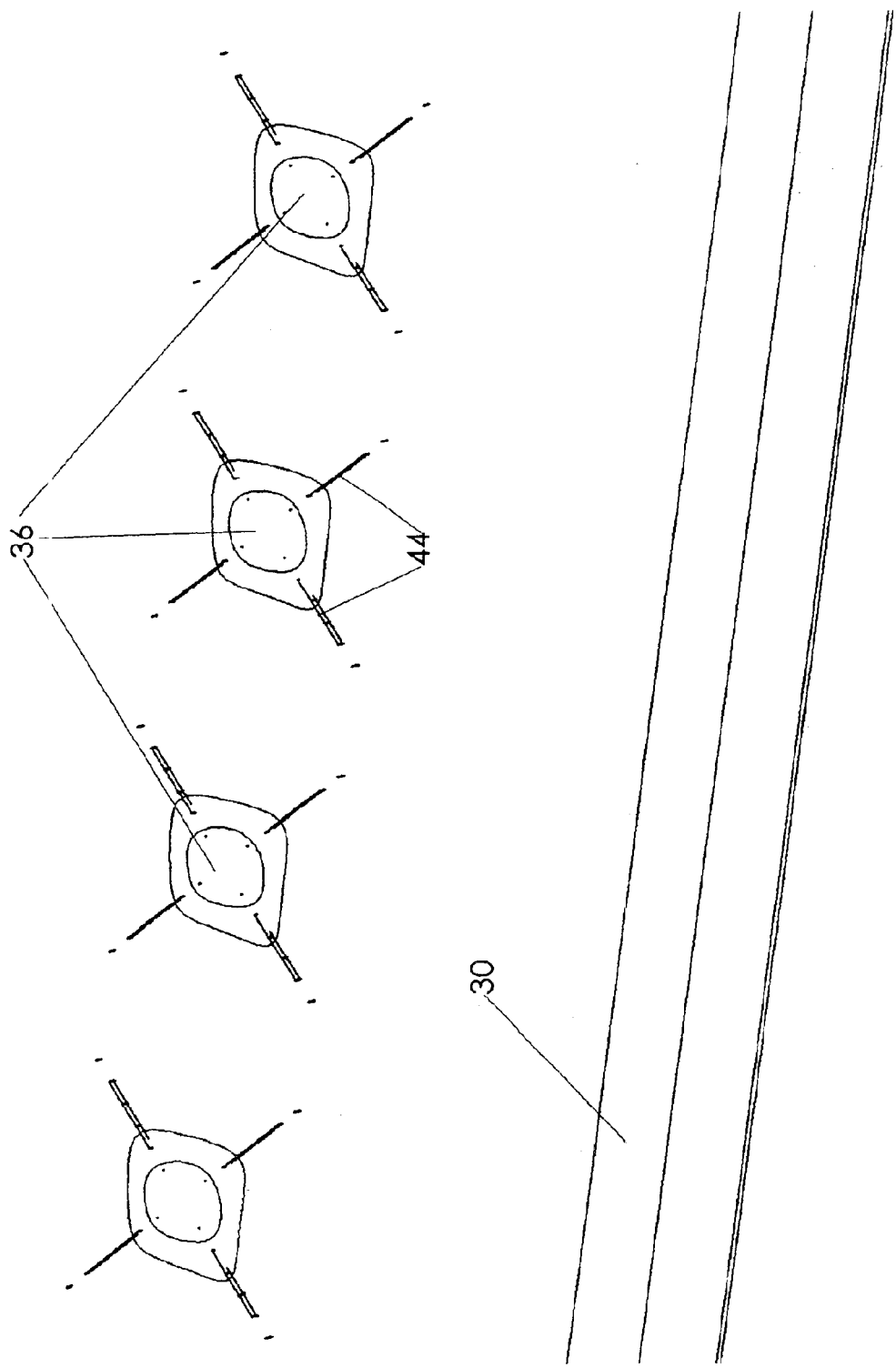
FIG. 10 is a perspective view, showing how a chain of accreted islands can be linked together.

In FIG. 10, the reader will observe how the fence assemblies can be extended outward from a series of accreted islands. These fence assemblies can be extended to the point where they actually overlap. A this point, the accreted islands begin to merge into a single unbroken mass.

Figure 11:
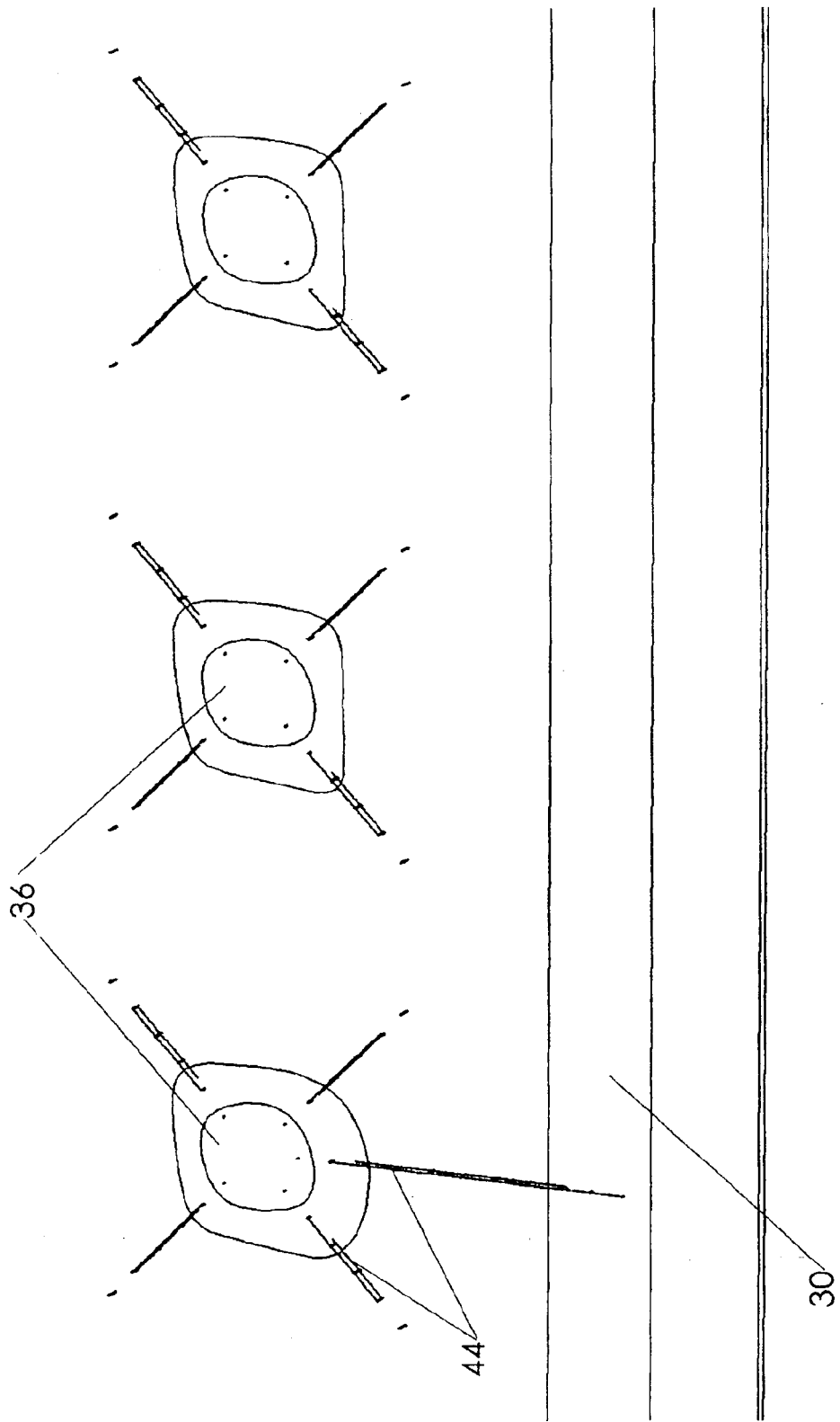
FIG. 11 is a perspective view, showing how a chain of islands can be joined with an existing beach.

Linear fence assemblies can also be used to join the accreted islands to the existing beach. FIG. 11 shows a fence assembly 44 placed between an accreted island 36 and beach 30. Such connecting fence assemblies can be placed between the beach and some or all of the accreted islands.

The fence assemblies have been shown in straight lines. However, the reader should appreciate that they can be formed in curving lines or any other shape which is particularly suited to the application. The goal is to ultimately merge the accreted islands with one another and with the original beach. A new beach is thereby formed at the position of the accreted islands.

The island-creating technique is also helpful for renourishing eroded areas other than beaches. As an example, the technique is helpful in restoring sand to an eroded point, such as on a barrier island.

Figure 12:
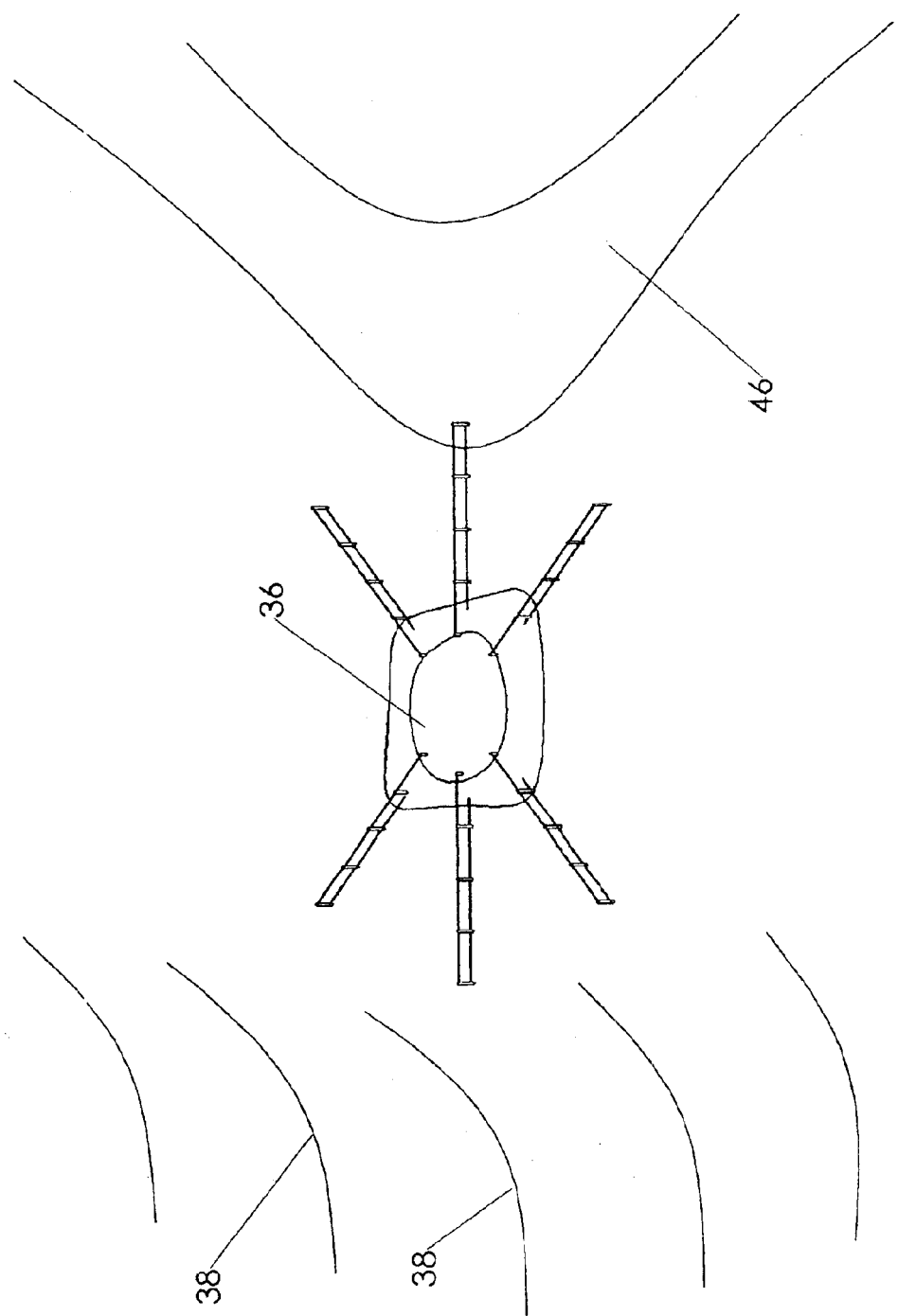
FIG. 12 is a perspective view, showing how an accreted island can be used to extend the tip of an existing barrier island.

FIG. 12 shows barrier island 46, which typically has surf regions 38 near a point such as the one shown. An accretion unit can be placed underwater in the vicinity of the point. The accretion unit is raised periodically, as explained previously, to accumulate an accreted island in the position shown. Fence assemblies can then be extended outward from the accreted island in an array. One or more of these fence assemblies may connect the accreted island to the barrier island. The accreted island may thereby be merged with the barrier island via the accretion of sand.

The reader will observe-that six-fence assemblies are used in FIG. 12, whereas only four assemblies were used in the prior examples. The optimum number of fence assemblies, as well as their shape, mesh size, and other characteristics, will vary depending upon the conditions prevailing at the site. Thus, the reader should not think of the invention as being constrained to the specific embodiments illustrated.

Figure 13:
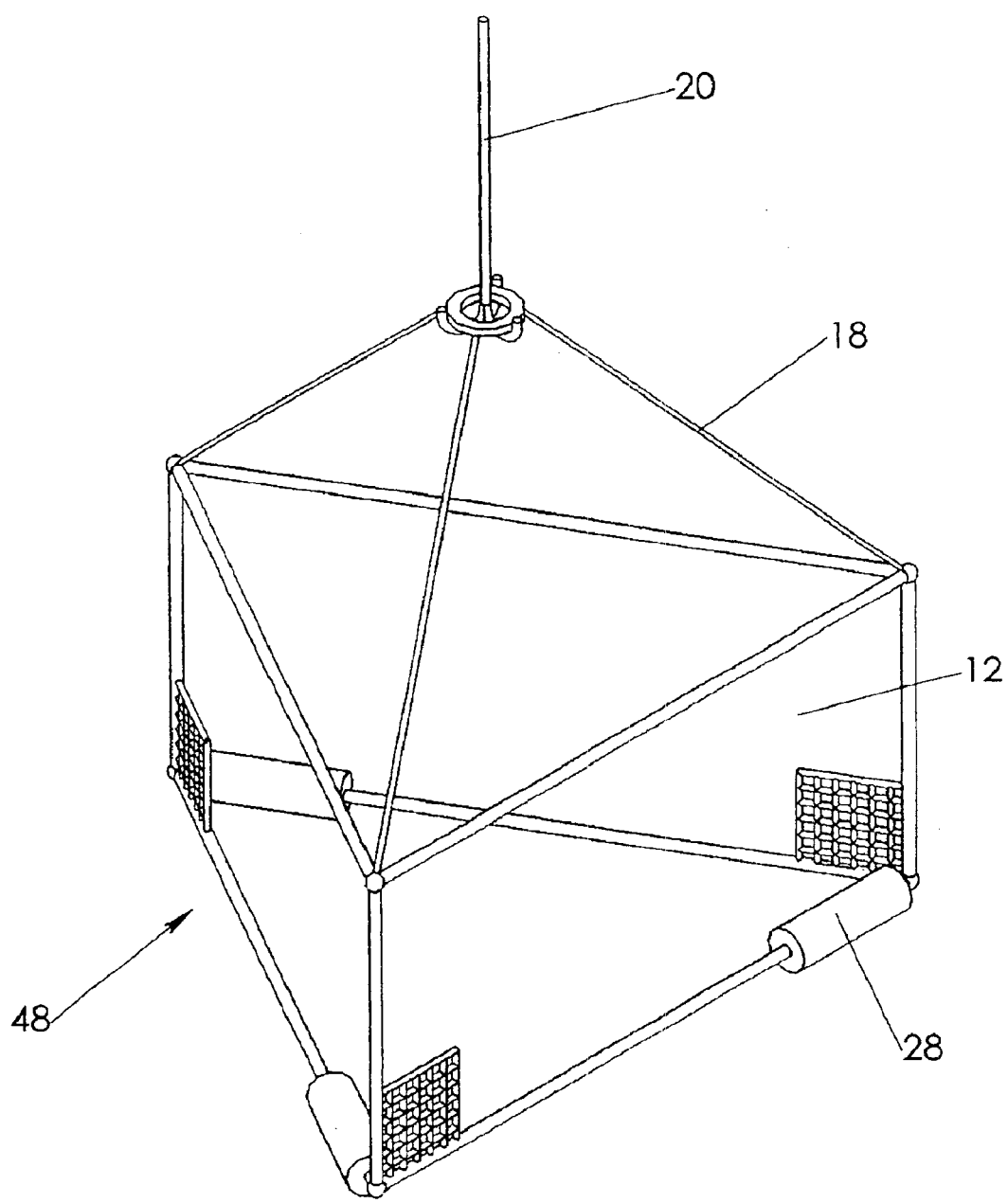
FIG. 13 is a perspective view, showing an alternate embodiment for the accretion unit.

Likewise, the reader should not think of the accretion unit as being constrained to the four-sided embodiment shown in FIG. 1. FIG. 13 shows a three-side embodiment, designated as alternate accretion unit 48. It includes a triangular frame and three mesh panels 12. The reader will also observe the use of a different type of sand-trapping mesh, in which the grid is composed of thin strips instead of simple round wires (Again, only a portion of the grid is shown). Lifting attachments are provided as well.

Figure 14:
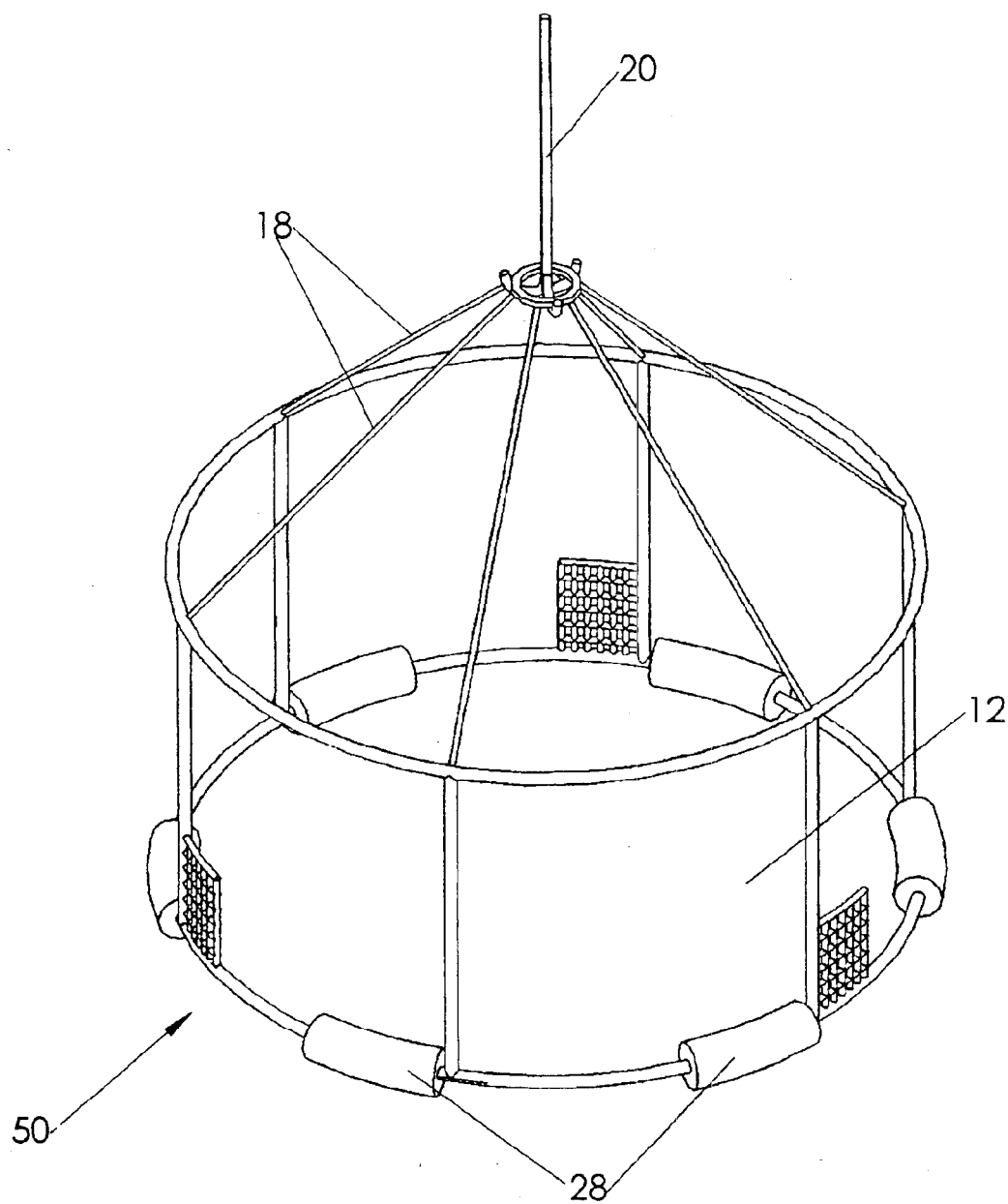
FIG. 14 is a perspective view, showing an alternate embodiment for the accretion unit.
Figure 15:
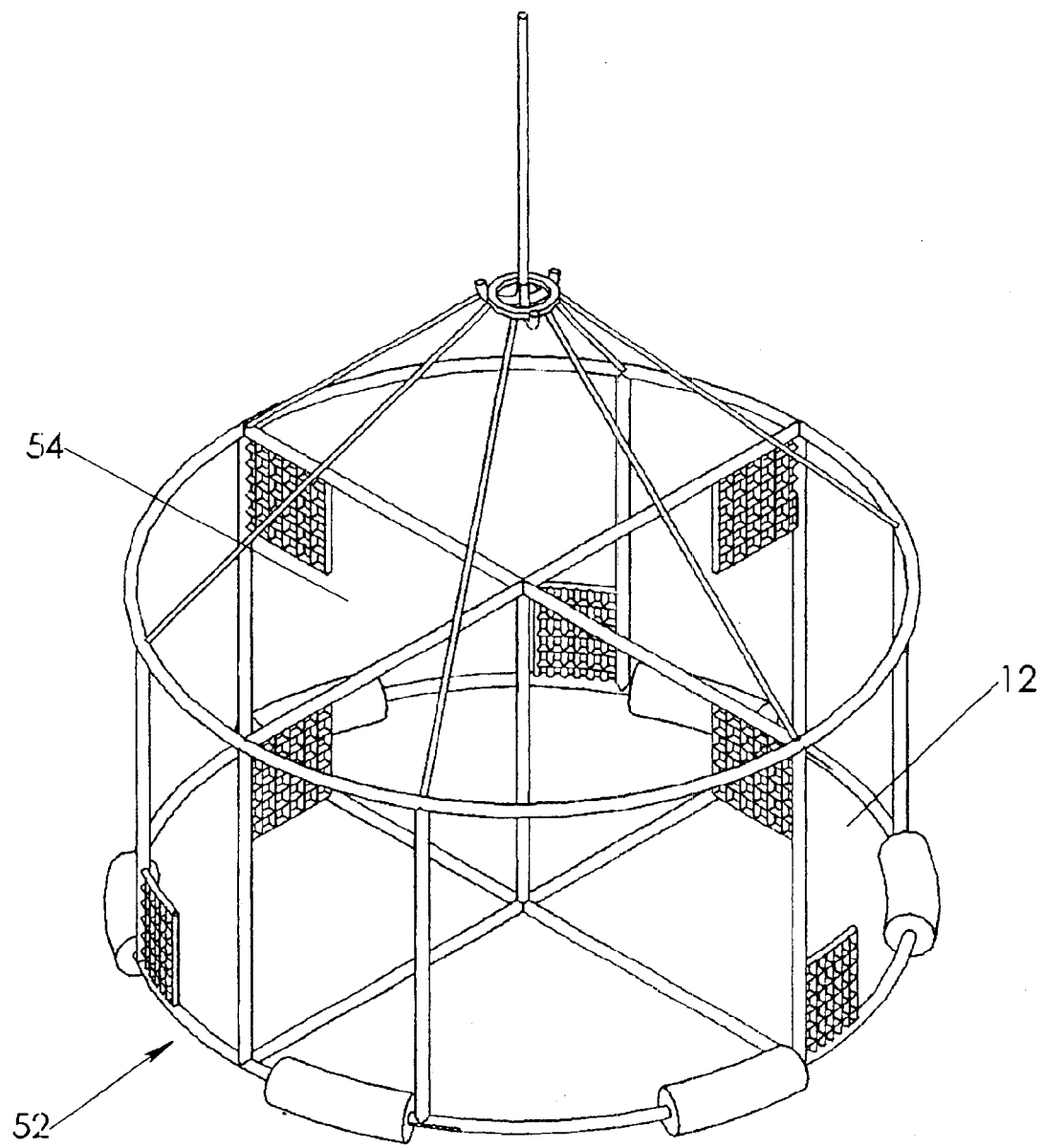
FIG. 15 is a perspective view, showing an alternate embodiment for the accretion unit.

FIG. 14 shows a round accretion unit designated as alternate accretion unit 50. This embodiment includes curved mesh panels. A second type of round accretion unit is shown in FIG. 15, designated as alternate accretion unit 52. This embodiment features four internal mesh panels 54 extending from the center of the circular mesh panels to the perimeter. Although only a portion of the actual mesh is shown, the reader will understand that the mesh actually extends across all of or substantially all of the panels. The use of internal mesh panels may also be advantageous for the other shapes shown, such as the accretion unit shown in FIG. 1 (where the internal mesh panels could connect from the center of the rectangle to each of the four corners).

Although the preceding description contains significant detail, it should not be construed as limiting the scope of the invention but rather as providing illustrations of the preferred embodiment of the invention. Thus, the scope of the invention should be fixed by the following claims, rather than by the examples given.

Having described my invention, I claim:

1. A method of renourishing a sand beach having sand particles suspended by wave action above the sea floor for a considerable distance out from said sand beach, comprising:
   a. providing an accretion unit, including a mesh panel;
   b. placing said accretion unit on said sea floor a distance from said beach;
   c. progressively raising said accretion unit as sand is deposited around said accretion unit, until said accretion unit forms an accreted island; and
   d. placing a plurality of mesh panels radiating outward from said accreted island to deposit additional sand, thereby enlarging the size of said accreted island until said accreted island merges with said beach.

2. A method of renourishing a sand beach as recited in claim 1, further comprising:
   a. providing additional accretion units, with each such accretion unit including a mesh panel;
   b. placing said additional accretion units on said sea floor a distance from said beach in order to form a plurality of said accretion units in a line running approximately parallel to said beach;
   c. progressively raising said plurality of accretion units as sand is deposited around said plurality of accretion units, until said plurality of accretion units forms a plurality of accreted islands; and
   d. placing a plurality of mesh panels radiating outward from each of said plurality of accreted islands to deposit additional sand, thereby enlarging the side of each accreted island until said accreted islands merge with each other and with said beach.

3. A method of renourishing an eroded point on a barrier island having sand particles suspended by wave action above the sea floor for a considerable distance out from said eroded point, comprising:
   a. providing an accretion unit, including a mesh panel;
   b. placing said accretion unit on said sea floor a distance from said eroded point;
   c. progressively raising sand accretion unit as sand is deposited around said accretion unit, until said accretion unit forms an accreted island;
   d. placing a series of mesh panels between said accreted island and said eroded point; and
   e. placing a plurality of mesh panels radiating outward from said accreted island to deposit additional sand, thereby enlarging the size of said accreted island until said accreted island merges with said eroded point.

4. A method of renourishing a sand beach as recited in claim 1, wherein said accretion unit comprises:
   a. a first mesh panel, oriented approximately vertically;
   b. a second mesh panel, oriented approximately vertically and joined to said second mesh panel;
   c. a third mesh panel, oriented approximately vertically, and joined to said third mesh panel; and
   d. a fourth mesh panel, oriented approximately vertically, and joined to said first and third mesh panels.

5. A method of renourishing a sand beach as recited in claim 1, wherein said accretion unit comprises:
   a. a first mesh panel, oriented approximately vertically;
   b. a second mesh panel, oriented approximately vertically and joined to said second mesh panel; and
   c. a third mesh panel, oriented approximately vertically, and joined to said first and second mesh panels.

6. A method of renourishing a sand beach as recited in claim 1, wherein said accretion unit comprises a cylindrical mesh panel, oriented approximately vertically.

7. A method as recited in claim 6, wherein said accretion unit further comprises a plurality of internal mesh panels.

8. A method of renourishing a sand beach as recited in claim 2, wherein said accretion unit comprises:
   a. a first mesh panel, oriented approximately vertically;
   b. a second mesh panel, oriented approximately vertically and joined to said second mesh panel;
   c. a third mesh panel, oriented approximately vertically, and joined to said third mesh panel; and
   d. a fourth mesh panel, oriented approximately vertically, and joined to said first and third mesh panels.

9. A method of renourishing a sand beach as recited in claim 2, wherein said accretion unit comprises:
   a. a first mesh panel, oriented approximately vertically;
   b. a second mesh panel, oriented approximately vertically and joined to said second mesh panel; and
   c. a third mesh panel, oriented approximately vertically, and joined to said first and second mesh panels.

10. A method of renourishing a sand beach as recited in claim 2, wherein said accretion unit comprises a cylindrical mesh panel, oriented approximately vertically.

11. A method as recited in claim 10, wherein said accretion unit further comprises a plurality of internal mesh panels.

12. A method of renourishing a sand beach as recited in claim 3, wherein said accretion unit comprises:

a. a first mesh panel, oriented approximately vertically;
   b. a second mesh panel, oriented approximately vertically and joined to said second mesh panel;
   c. a third mesh panel, oriented approximately vertically, and joined to said third mesh panel; and
   d. a fourth mesh panel, oriented approximately vertically, and joined to said first and third mesh panels.

13. A method of renourishing a sand beach as recited in claim 3, wherein said accretion unit comprises:

a. a first mesh panel, oriented approximately vertically;
   b. a second mesh panel, oriented approximately vertically and joined to said second mesh panel; and
   c. a third mesh panel, oriented approximately vertically, and joined to said first and second mesh panels.

14. A method of renourishing a sand beach as recited in claim 3, wherein said accretion unit comprises a cylindrical mesh panel, oriented approximately vertically.

15. A method as recited in claim 14, wherein said accretion unit further comprises a plurality of internal mesh panels.

* * * * *